United States Patent
Sitton et al.

(10) Patent No.: US 7,864,628 B2
(45) Date of Patent: Jan. 4, 2011

(54) FLEXURAL WAVE ATTENUATION

(75) Inventors: Gary A. Sitton, Houston, TX (US); Theodore C. Stieglitz, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 36 days.

(21) Appl. No.: 12/170,309

(22) Filed: Jul. 9, 2008

(65) Prior Publication Data
US 2010/0008186 A1    Jan. 14, 2010

(51) Int. Cl.
G01V 1/38 (2006.01)
(52) U.S. Cl. ...................................... 367/24
(58) Field of Classification Search ................... 367/15, 367/21, 24, 37, 43–46
See application file for complete search history.

(56) References Cited

U.S. PATENT DOCUMENTS

| | | | |
|---|---|---|---|
| 4,458,341 A * | 7/1984 | Goebel | 367/43 |
| 5,408,441 A | 4/1995 | Barr et al. | |
| 5,572,483 A * | 11/1996 | Chambers et al. | 367/45 |
| 5,774,417 A | 6/1998 | Corrigan et al. | |
| 5,781,503 A * | 7/1998 | Kim | 367/45 |
| 5,825,716 A | 10/1998 | Starr | |
| 6,519,205 B1 * | 2/2003 | Baeten et al. | 367/45 |
| 6,961,283 B2 * | 11/2005 | Kappius et al. | 367/43 |

FOREIGN PATENT DOCUMENTS

| | | |
|---|---|---|
| CA | 1104703 | 7/1981 |
| CA | 1212337 | 10/1986 |
| CA | 1221313 | 5/1987 |
| CA | 1221314 | 5/1987 |
| GB | 1415706 | 11/1975 |

OTHER PUBLICATIONS

Henley, David C., "Common-mode noise discrimination on multi-component seismic data", CREWES Research Report, vol. 17, pp. 1-31, (2005).

* cited by examiner

Primary Examiner—Jack Keith
Assistant Examiner—Krystine Breier
(74) Attorney, Agent, or Firm—Wong, Cabello, Lutsch, Rutherford & Brucculeri, LLP (57) ABSTRACT

A seismic information processing method and apparatus includes attenuating flexural wave noise information from seismic information. Flexural wave information removal includes receiving the seismic information using an information processing device interface, the seismic information having a plurality of directional components acquired using a multi-axis motion sensor coupled to ice floating on a body of water, the seismic information including desired seismic information and the flexural wave information. A noise model of the flexural wave information may be generated using at least one of the plurality of seismic information directional components using an information processing device. The noise model is improved using an adaptive correction filter, and the improved noise model is applied to at least one directional component of the received seismic information to attenuate the flexural wave information wave in the seismic information.

23 Claims, 4 Drawing Sheets

FLEXURAL WAVE ATTENUATION

BACKGROUND

1. Technical Field

The present disclosure generally relates to seismic prospecting and in particular to methods and apparatus for acquiring and processing geophysical information.

2. Background Information

In the oil and gas exploration industry, geophysical tools and techniques are commonly employed in order to identify a subterranean structure having potential hydrocarbon deposits. Many of these techniques and tools utilize energy in the form of seismic waves to determine subterranean properties, and techniques utilizing seismic waves are often commonly referred to as seismic exploration. Seismic exploration is used in many cases to generate images of subsurface structures by recording energy in the form of vibrations after the energy has been imparted into the earth and has reflected or refracted from geologic formations.

In seismic exploration, seismic waves travel through the ground and reflect off rocks in the subsurface. Boundaries between different rocks often reflect seismic waves, and information relating to these waves is collected and processed to generate a representation or "pictures" of the subsurface. Any number of exploration systems may be used to gather the desired information for processing. Dynamite explosions, vibrator trucks, air guns or the like may be used to create the seismic waves, and sensors such as velocity geophones, accelerometers and/or hydrophones may be laid out in lines, or towed in the case of hydrophones, for measuring the amplitude of waves due to the seismic source, reflected off rock boundaries, and then returning to the deployed sensors.

A two-dimensional image, which is called a seismic line, is essentially a cross-sectional view of the earth oriented parallel to a line of sensors such as geophones. The information may also be collected as an intersecting grid of seismic lines referred to as a 3-D seismic volume.

Seismic prospecting today generally results in an extremely vast amount of information to be processed in order to obtain a subsurface image. Information in the form of signals representing acquired seismic information often includes additional noise signals that may often require processing the information to obtain the more desirable seismic information. Removal of the noise portion of the signal simplifies processing of the desirable seismic information.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is a method and apparatus for attenuating undesired flexural wave information found in some seismic information. Attenuating the flexural waves includes receiving the seismic information using an information processing device interface, the seismic information having a plurality of directional components acquired using a multi-axis motion sensor coupled to ice floating on a body of water, the seismic information including desired seismic information and the flexural wave information. A noise model of the flexural wave information may be generated using at least one of the plurality of seismic information directional components using an information processing device. The noise model is improved using an adaptive correction filter, and the improved noise model is applied to at least one directional component of the received seismic information to attenuate the flexural wave information wave in the seismic information.

In another aspect, a computer-readable medium having computer executable instructions stored thereon, that when executed using a computer, perform a method for attenuating flexural wave information in seismic information including receiving the seismic information using an information processing device interface, the seismic information having a plurality of directional components acquired using a multi-axis motion sensor coupled to ice floating on a body of water, the seismic information including desired seismic information and the flexural wave information. A noise model of the flexural wave information may be generated using at least one of the plurality of seismic information directional components using an information processing device. The noise model is improved using an adaptive correction filter, and the improved noise model is applied to at least one directional component of the received seismic information to attenuate the flexural wave information wave in the seismic information.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Portions of the present disclosure, detailed description and claims may be presented in terms of logic, software or software implemented aspects typically encoded on a variety of media including, but not limited to, computer-readable media, machine-readable media, program storage media or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The present disclosure uses terms, the meaning of which terms will aid in providing an understanding of the discussion herein. For example, the term information processing device mentioned above as used herein means any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

Geophysical information as used herein means information relating to the location, shape, extent, depth, content, type, properties of and/or number of geologic bodies. Geophysical information includes, but is not necessarily limited to marine and land seismic information. Seismic information as used herein includes, but is not limited to, one or more or any combination of the following, analog signals, digital signals, recorded data, data structures, database information, parameters relating to surface geology, source type, source location, receiver location, receiver type, time of source activation, source duration, source frequency, energy amplitude, energy phase, energy frequency, wave acceleration, wave velocity and/or wave direction.

Geophysical information may be used for many purposes. In some cases, geophysical information such as seismic information may be used to generate an image of subterranean structures. Imaging, as used herein includes any representation of a subsurface structure including, but not limited to, graphical representations, mathematical or numerical representation, strip charts or any other process output representative of the subsurface structure.

Figure 1:
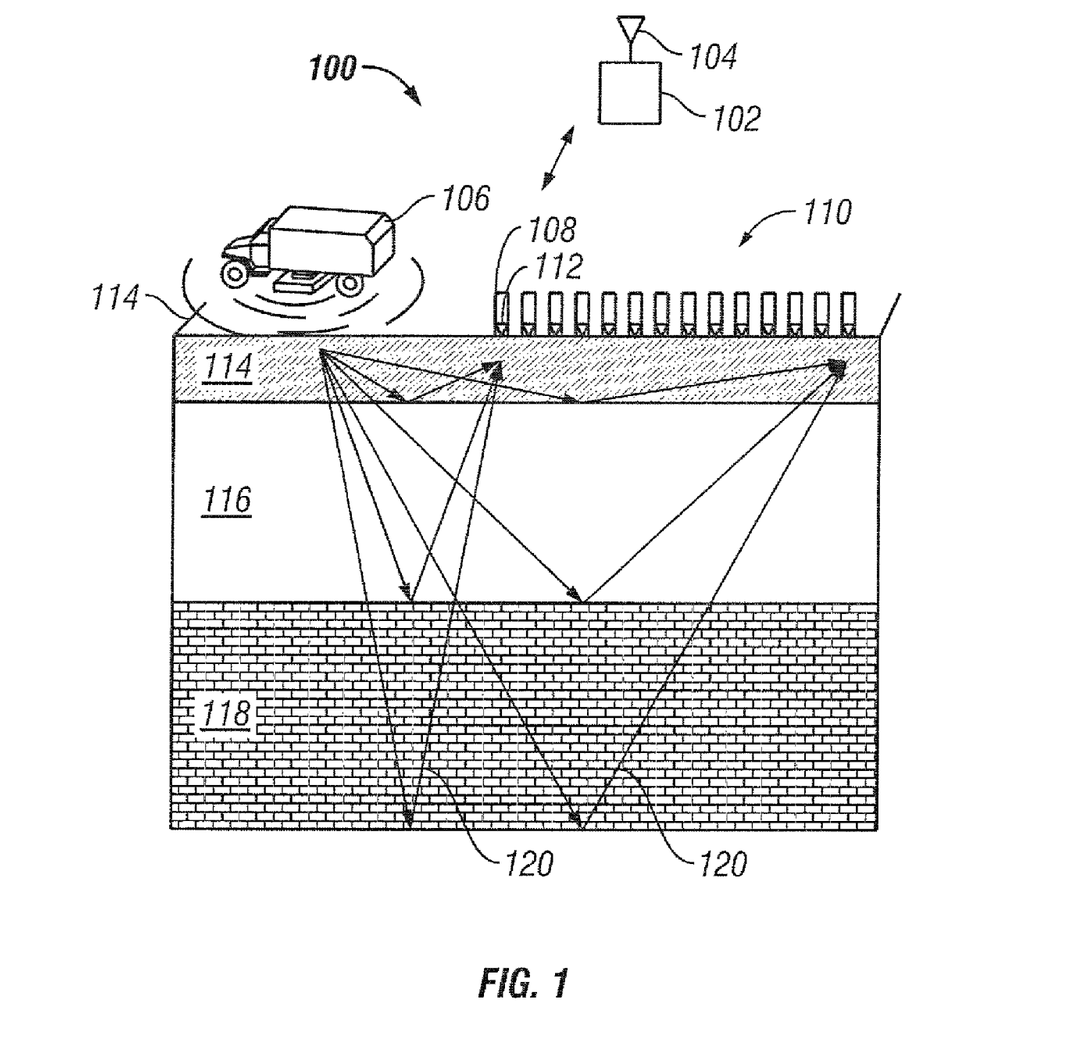
FIG. 1 is a non-limiting example of a seismic survey system for generating geophysical information used for imaging earth subsurface structures.

FIG. 1 is a non-limiting example of a seismic survey system 100 for generating geophysical information used for imaging earth subsurface structures, which information may be used in the methods described herein. The system 100 includes a central controller/recorder 102 in communication with a seismic acquisition array 110, known as a spread laid out on a sheet of ice 114 above a body of water 116. The body of water 116 covers a media of interest 118 that may include a sediment bed. The media of interest 118 carries seismic waves 120 generated by a seismic source 106. The seismic acquisition array 110 includes spaced apart sensor stations 108, and each sensor station may include a number of sensors 112. The seismic source 106 imparts acoustic energy in the form of seismic waves 120 into the earth and media of interest 118, and the energy is received at the sensors 112 after reflection and refraction at boundaries such as those found in earth subsurface structures.

In some aspects, the array 110 may communicate with the central controller/recorder 102 using wireless technology as shown using an antenna 104 at the central controller/recorder to receive geophysical information. In other non-limiting embodiments, the array may utilize not-shown electrical conductor cables for communicating geophysical information among the sensor stations 108 as well as to and from the recorder station 102.

Continuing with the example of FIG. 1, the sensors 112 may include several sensors for measuring geophysical information. The sensors 112 may include 3-component sensors for obtaining 3-component energy known as 3C seismic. The sensors 112 may include motion sensors such as accelerometers and/or velocity geophones to capture seismic information at the sensor station. In one example, three-component digital accelerometers may be employed to gather acceleration information in digital form at the sensor stations. In another example, three-component velocity geophones may be used. When using either a three-component accelerometer and/or a three-component velocity geophone, processing techniques may be used to convert the acceleration and/or the velocity information to desired units for further processing.

Other sensors may be used for gathering additional geophysical information useful in conducting the seismic survey. Non-limiting examples of additional sensors include, microphones, hydrophones pressure sensors, magnetometers, global position systems, timing devices or any combination of sensors useful in obtaining geophysical information.

In one non-limiting example, gathered seismic information includes any one or combination of P-wave information, S-wave information, pressure information, temperature, timing information, shot information, location information and orientation information. Those skilled in the art will also appreciate that the present disclosure includes processing so-called full wave seismic information.

Geophysical information may include recorded seismic information having both desired signals and undesired signals or noise that are each recorded using seismic sensors. Some noise signals are media dependent energy waves and have unique characteristics depending on whether the wave media is land, water or ice.

When a layer of ice on water is excited with a seismic source, strong waves propagating on the surface called flexural waves are generated. The exact nature of these waves is determined by the thickness of the ice and depth of the water below it. Flexural waves are distinguished from land-media Rayleigh waves, which are sometimes referred to as ground roll. Rayleigh ground-roll waves have a propagation velocity relatively independent of their frequency. On the other hand, flexural waves are strongly reverse dispersive in that the higher frequencies of the flexural waves travel faster than the lower frequencies. Both types of surface waves have a propagation velocity much slower than the normal compressional or p-waves in the surface media. One reason for the differences between Rayleigh and flexural waves is that the water layer does not support shear wave propagation.

Like ground roll, flexural waves on ice exhibit a dual mode of wave propagation. Flexural waves propagate by virtue of both compressional p-waves and shear or s-waves in a synchronized fashion. In the direction of propagation (in-line horizontal) p-waves are observed, whereas vertical motion results from s-waves. The resulting surface particle motion is described by elliptical trajectories with the vertical and horizontal displacement components having a 90° phase relationship.

Disclosed are devices and methods for attenuating noise from geophysical information. In several non-limiting examples, the noise is in the form of flexural waves generated in an ice sheet where the ice sheet is floating on a body of water above a terrain of interest.

Flexural waves may be directly suppressed in various ways. In some cases, the use of vertically polarized sources such as vibrators in place of impulse non-polarized sources such as dynamite reduces horizontally propagating compressional waves and thus the flexural waves themselves. The use of vibrator arrays, which can directionally cancel residual horizontal modes, reduces flexural waves. In another example, the ice layer over the water may be sliced with an ice saw to create an ice gap. The ice gap provides an acoustic barrier to interfere with the flexural wave propagation perpendicular to the ice gap.

Using sources below the ice in the water or particularly on the water bottom will reduce or eliminate flexural waves in the ice sheet above the source, because shear waves cannot propagate from the source to the ice through the body of water. Thus, the ice sheet is excited by a spherical compression wave front from below which does not excite the appropriate shear waves in the ice to evoke flexural waves. The above direct suppression methods may leave some noise for recording, may be cost prohibitive or their implementation may be impractical for some ice sheet fields. Therefore, the following discussion will address processing methods and devices for attenuating flexural noise waves recorded in ice sheet fields in addition to, or in place of, the above-described direct suppression techniques.

The removal of flexural waves from geophysical information acquired on ice is more challenging because of the non-stationary nature of the noise due to its reverse-dispersive characteristics. Methods disclosed herein utilize an adaptive filtering paradigm to estimate a desired signal S from an observed signal S', where the observed signal S' includes the desired signal S combined with noise N. In most cases, the desired signal S includes seismic information useful in the imaging of a subterranean structure.

The several embodiments described below with reference to FIGS. 2 and 3 use notations to symbolize signal and processing components for noise removal. Time-varying signals, represented by σ are related to an offset distance x and time t, e.g, σ(x,t). When dealing with multi-component signals, σ would therefore need further notations for each component x (horizontal), y(horizontal) and z(vertical). We will use x in σ(x,t) as a general spatial dimension for offset and the use functional notation S and S' to represent these signals for simplicity. An acquired or observed multi-component seismic signal S' includes a desired or true seismic signal S corrupted by multi-component undesirable signals or noise N. The multi-component signal S includes a vertical component V that includes seismic information. The desired vertical signal may be represented by $S_V$ and the noise in the vertical signal may be represented by $N_V$. The acquired vertical signal may be a raw signal, meaning that there is little or no preprocessing or filtering. Equation 1 represents the vertical component of the acquired signal.

$$V = S_V + N_V \qquad \text{Equation 1}$$

Horizontal components of a multi-component acquired signal S may include a cross-line $H_x$ component, an in-line $H_i$ component, and a radial $H_r$ component that may be computed using energy arrival information. The signal cross-line component $H_x$ is perpendicular to the direction of flexural wave propagation and the in-line $H_i$ component in parallel with the direction of propagation. So, in theory the dominant noise will be in the $H_i$ component. In some cases, the flexural wave may include reflections causing the noise to exhibit an altered direction of propagation, and where three component sensors having horizontal sensors, in some cases the sensors may be oriented such that the direction of propagation and arrival angle may be angularly displaced from $H_i$. In these cases, a radial horizontal component $H_r$ may be computed and used instead or in conjunction with $H_x$ and $H_i$.

The dominant azimuthal noise arrival angle is represented by Φ. A model or approximation of the additive noise is represented by N' such that N'≈N. A band limiting filtering process is represented by B(N'). A dispersion removal process for the primary signal σ may be represented by D(σ), and a dispersion removal process for the model N' may be represented by D(N'). Components of the signal S may be rotated. A horizontal component phase rotation process may be represented by H(B(N')) in the case of rotating band-limited model N', or the horizontal component phase rotation process may be represented by H(B(D(N'))) in the case of rotating band-limited model N'. The phase rotation may include any useful angle of rotation. In several examples herein, the phase rotation is 90°. A dispersion restoration process may then be represented by $D^{-1}(\sigma)$, by $D \, D^{-1}(N')$ or by $D^{-1}(B(D(N')))$.

A filtering process F(N') represents a filter for improving the noise model N' approximation of the true noise N. In several aspects of the disclosure, the filtering process F(N') is an adaptive process, which may include one or more iterations for improving N'. The improved noise model, represented by N", is more representative of the true noise N. Equation 2 shows the relationship between N, N' and N".

$$N \approx N'' = F(N') \qquad \text{Equation 2}$$

So, using the improved noise model yields an approximately denoised signal component represented by equation 3.

$$S \approx V - N'' = (S+N) - F(N') \qquad \text{Equation 3}$$

With respect to a vertical signal component $S_V$, equation 3 may be modified as shown in equation 4.

$$S_V \approx V - N''_V = (S'_V + N_V) - F(N'_V) \qquad \text{Equation 4}$$

Adaptive filtering according to the disclosure may be used to determine F(N'). In one example, F(N') may be determined by defining a least squares problem, which finds an approximate solution. This class of solutions is known to minimize the sum of squares of specified error. In several examples, other known data processing may be used to determine F(N').

Figure 2:
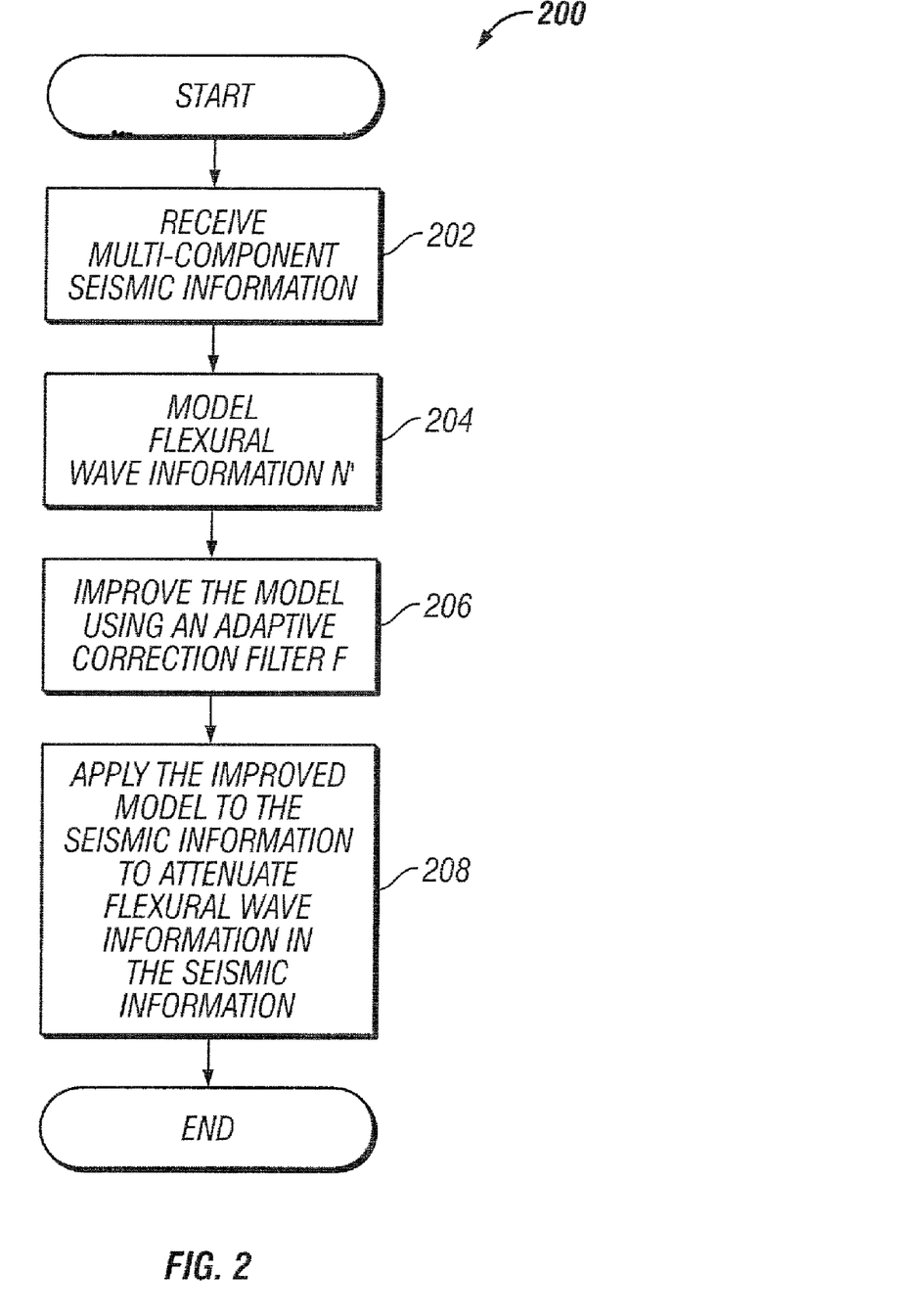
FIG. 2 is a non-limiting example of a geophysical information processing method for attenuating flexural wave information in seismic information.

FIG. 2 illustrates a non-limiting example of a geophysical information processing method 200 for attenuating flexural wave information in seismic information. In one example, the method 200 may be used for processing raw common shot gathers to remove flexural noise.

Geophysical information gathered using a system 100 as described above and shown in FIG. 1 is received for processing 200. In several embodiments, the information may be entered into or received by an information processing device as described below and shown in FIG. 4. In one example, the geophysical information received includes multi-component seismic information relating to directional components vertical V, cross-line horizontal $H_x$, and in-line horizontal $H_i$ information. In several embodiments Hr may be received for processing.

The exemplary method of FIG. 2 further includes modeling flexural wave information N' 204. The flexural wave information model N' may be improved using an adaptive correction filter F(N') to generate an improved model N" 206. The improved model N" may then be applied to the seismic information to attenuate flexural wave information in the seismic information.

Figure 3:
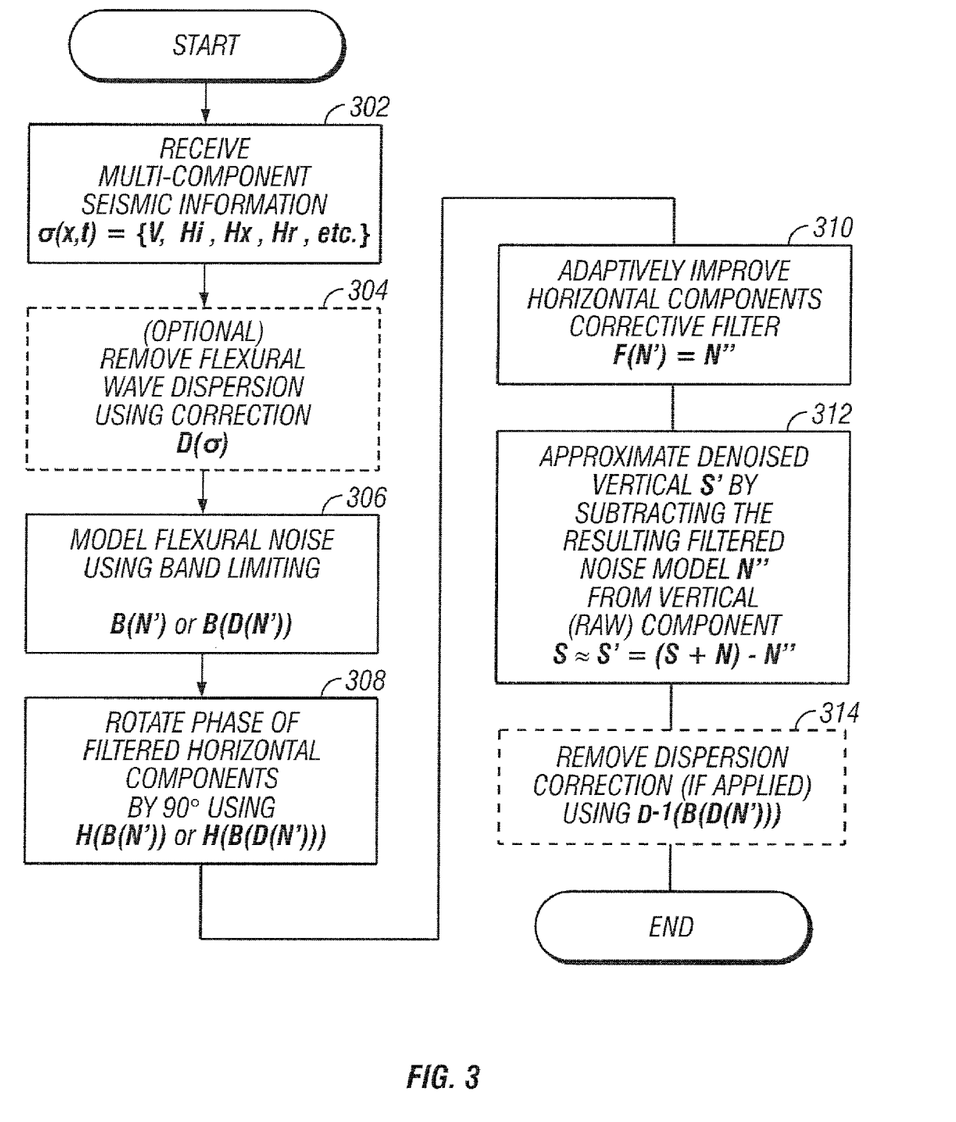
FIG. 3 illustrates another non-limiting example of a geophysical information processing method for attenuating flexural wave information in seismic information.

FIG. 3 shows another non-limiting example of a geophysical information processing method 300 for attenuating flexural wave information in seismic information. The method 300 includes some processing similar to that described above and shown in FIG. 2 with additional filtering added. Continuing now with FIG. 3, geophysical information gathered using a system 100 as described above and shown in FIG. 1 is received for processing 302. In several embodiments, the information may be entered into or received by an information processing device as described below and shown in FIG. 4. In one example, the geophysical information received includes multi-component seismic information relating to directional components vertical V, cross-line horizontal $H_x$, and in-line horizontal $H_i$ information. In another example, the geophysical information received includes multi-component seismic information relating to directional components vertical V, a horizontal radial component $H_r$. In one non-limiting aspect, the horizontal radial component $H_r$ may be estimated using the cross-line horizontal $H_x$, and in-line horizontal $H_i$ information. As discussed above, the received information may include several components of time-varying information, or σ(x,t)={V, Hi, Hx, Hr, etc.}. In some cases, the received information may include processed signals σ', for example σ'(x,t)={D(σ), B(σ), etc.}

The method 300 may optionally include removing flexural wave dispersion using a dispersion correction process D(σ) 302 for removing dispersion information. In one example, the dispersion correction process D(σ) may include locally warping the time axis directly. In another non-limiting example, the dispersion correction process D(σ) may include compressing the noise wavelet by spectral phase shifting. These particular examples are for illustration only, and other dispersion correction processes D(σ) may be used without further discussion. These other dispersion correction processes are considered within the scope of the disclosure. In each case, the dispersion process D may be applied to modeled noise (N')

The method 300 further includes modeling flexural noise N' by band limiting vertical and horizontal information to the noise bandwidth using a band limiting process B(N') 306. In one example, V, $H_x$ and $H_i$ are each independently band limited. In another example, V and $H_r$ is each band limited. The band limit frequency range may be any useful range for limiting the seismic information for modeling the flexural noise. In one example the band limiting process B(N') includes a one-dimension (1D) Fourier filtering techniques, e.g. frequency only. In another example the band limiting process B(N') includes a two-dimensional (2D) Fourier filtering techniques, e.g. frequency wave number (FK). In another non-limiting example the band limiting process B(N') includes using Tau-P or radial trace filtering methods. In another non-limiting example, the band limiting process B(N') includes band limiting each of the directional components V, $H_x$, $H_i$ and/or $H_r$ to a non-dispersive noise bandwidth of about 5 to 30 Hz.

The method 300 further includes rotating the phase of the filtered horizontal components 90° using a phase rotation process H(B(N')) or H(B(D(N'))) 308. In one example the phase rotation process H(B) includes using a discrete Hilbert transform.

The method 300 may further include adaptively determining a corrective filter F(N') used to improve the model N' using noise model data from the horizontal components $H_x$, $H_i$ or $H_r$ 310. In one example, the noise model data may be based on the predominantly in-line horizontal component $H_i$. In another example, the noise model data may be based on the radial component $H_r$ computed from in-line and cross-line horizontal components $H_i$ and $H_x$. $H_r$ may be computed using direction of arrival Φ of the received seismic wave. In another example, the noise model data may be based on both $H_i$ and $H_x$ in a multi-component adaptive process.

The method 300 may further include approximating S. In the case of vertical information, $S_v$, which is the denoised vertical S', by subtracting the resulting filtered or improved noise model N'' from the vertical (raw) component V 312. Inverting time warping/phase transformations on denoised vertical component using $D^{-1}(B(d(N')))$ 314 may be performed when the optional dispersion removal D(N') is implemented.

The methods described above and shown in FIGS. 2 and 3 may be carried out using a computer system using one or more programs and utilizing the principles of the discussion above. Any available recorded seismic information, where the seismic information is gathered using multi-component sensors may be used for the method. The sensors used may be a three-component (3C) sensor, such as sensor 112 described above and shown in FIG. 1 for allowing the vertical, radial horizontal, in-line horizontal and cross-line horizontal components of the surface displacement to be acquired.

Attenuating or removal of flexural wave noise from vertical seismic information component may be performed by the disclosed processing method alone by processing raw shot gathers or traces. In one aspect, acquisition of seismic information on ice is separately performed using three (3) component sensors. In one example, raw common shot gathers for use in the method are gathered at sensors receiving seismic energy generated using a non-impulse seismic source.

One skilled in the art with the benefit of the present disclosure will recognize that using the disclosed adaptive filtering on multi-component seismic information using the horizontal information as a noise model of the flexural waves corrupting the vertical component does not necessarily require the elimination of the dispersive nature of the noise. Therefore, the reduction of dispersion further enhances the noise removal process and serves to facilitate the adaptive filtering process and helps in the overall effectiveness of the process.

Figure 4:
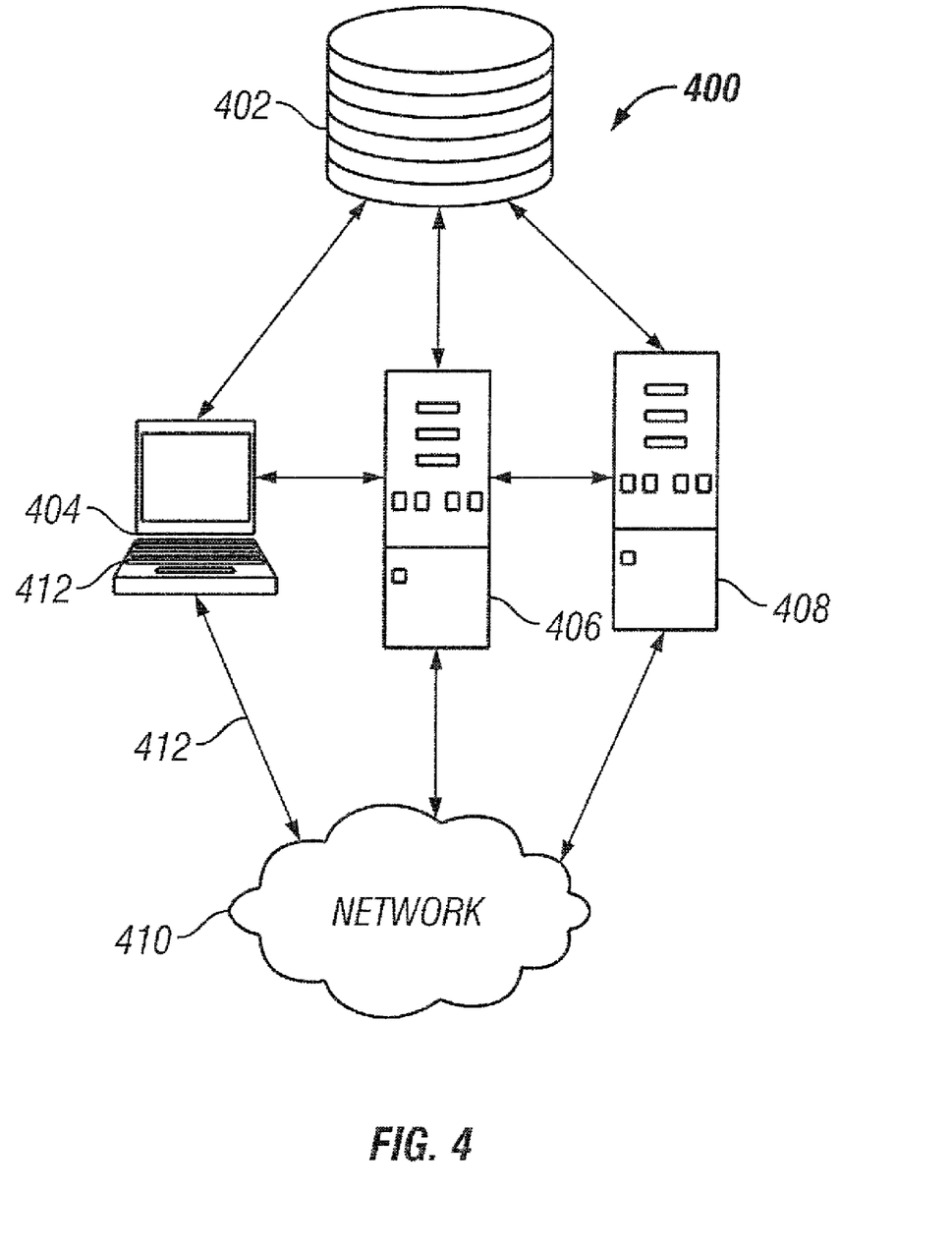
FIG. 4 illustrates a non-limiting example of a system used for carrying out several disclosed methods for attenuating flexural wave information in seismic information.

FIG. 4 illustrates a non-limiting example of an information processing system 400 that may be used to carry out the methods disclosed herein. Geophysical information may be gathered from a system 100 as described above and shown in FIG. 1. In several non-limiting examples, the system 400 may include one or more or any combination of the components shown in FIG. 4. In one example, the system 400 may include one or more processing devices such as a computer and a storage device 402. The computer may be selected from any number of useful computer devices, examples of which include, but are not limited to, laptop computers 404, desk top computers 406, mainframes 408 and the like. While a laptop-type is shown, the processing unit need not include user interface devices. However, when appropriate, the computer 404 may include a display, keyboard and or other input/output devices such as printers/plotters, a mouse, touch screen, audio output and input or any other suitable user interface.

The computer 404, 406, 408 may be in communication with the storage device 402 via any known interface. An information processing device interface 412 for entering information into the computer 404, 406, 408 may be any acceptable interface. For example, the interface may include the use of a network interface 410.

The storage device 402 may be any useful storage device having a computer-readable media. Instructions for carrying out the disclosed method may be stored on computer-readable media in the computer 404, 406, 408 or may be stored on an external storage device 402.

Having described above the several aspects of the disclosure, one skilled in the art will appreciate several particular embodiments useful in determining a property of an earth subsurface structure.

In one particular embodiment, a method for attenuating flexural wave information from seismic information includes receiving the seismic information using an information processing device interface, the seismic information having a plurality of directional components acquired using a multi-axis motion sensor coupled to ice floating on a body of water, the seismic information including desired seismic information and the flexural wave information. A noise model of the flexural wave information may be generated using at least one of the plurality of seismic information directional components using an information processing device. The noise model is improved using an adaptive correction filter, and the improved noise model is applied to at least one directional component of the received seismic information to attenuate the flexural wave information wave in the seismic information.

In several particular embodiments, a method for attenuating flexural wave information from seismic information includes, receiving the seismic information using an information processing device interface, the seismic information having a plurality of directional components, wherein the plurality of directional components includes a vertical component V, a cross-line horizontal directional component Hx, an in-line horizontal directional component Hi an/or a horizontal radial component Hr. The modeling may include using Hx, Hi and/or Hr.

In another particular embodiment, a method for attenuating flexural wave information from seismic information includes receiving the seismic information using an information processing device interface, the seismic information having a plurality of directional components acquired using a multi-axis motion sensor coupled to ice floating on a body of water, wherein the multi-axis motion sensor recording the seismic information includes a velocity sensor and the seismic information includes velocity information. The multi-axis motion sensor recording the seismic information may an acceleration sensor and the seismic information includes acceleration information. The multi-axis motion sensor may be an acceleration sensor that includes three orthogonal digital accelerometers.

In another particular embodiment, a method for attenuating flexural wave or noise information from seismic information includes using a band filter to limit seismic information in each of the plurality of components to a band containing the noise. In one embodiment the band containing the noise has a frequency range of about 5 Hz to about 30 Hz. The band filter may include at least one of a 1D frequency filter, a 2D FK filter, a Tau-P filter, and a radial trace filter.

In another particular embodiment, a method for attenuating flexural wave information from seismic information includes removing flexural wave dispersion in the seismic information using dispersion correction. Removing flexural wave dispersion in the seismic information may be performed by locally warping a time axis and/or by compressing a noise wavelet using spectral phase shifting. In several embodiments, dispersion correction is removed after applying an improved model to the seismic information.

In another particular embodiment, a method for attenuating flexural wave information from seismic information includes rotating a phase of at least one of the plurality of directional components. Where at least one on the plurality of directional components includes a horizontal component, one embodiment may include rotating a phase of the horizontal component 90 degrees.

In another particular embodiment, a method for attenuating flexural wave information from seismic information includes applying an improved noise model to at least one directional component of the received seismic information by subtracting the improved model from a vertical directional component of the seismic information.

In yet another particular embodiment, an apparatus for attenuating flexural wave information from seismic information includes an information processing device. An information processing device interface receives the seismic information for processing in the information processing device. The seismic information may have a plurality of directional components acquired using a multi-axis motion sensor coupled to ice floating on a body of water, the seismic information includes the flexural wave information. The information processing device generates a noise model of the flexural wave information using at least one of the plurality of seismic information directional components and uses an adaptive correction filter to improve the noise model. The information processing device applies the improved noise model to at least one directional component of the received seismic information to attenuate the flexural wave information wave in the seismic information.

In one particular embodiment, an apparatus for attenuating flexural wave information from seismic information includes an information processing device interface that receives the seismic information for processing in an information processing device. The seismic information may have a plurality of directional components acquired using a multi-axis motion sensor coupled to ice floating on a body of water. The multi-axis motion sensor recording the seismic information may include a velocity sensor and the seismic information includes velocity information, the multi-axis motion sensor may include an acceleration sensor and the seismic information includes acceleration information. In one embodiment the multi-axis motion sensor may include an acceleration sensor having three orthogonal accelerometers.

In yet another particular embodiment, a method for attenuating flexural wave information from seismic information includes receiving the seismic information using an information processing device interface, the seismic information having a vertical directional component and at least one horizontal component, the vertical directional component and at least one horizontal directional component acquired using a multi-axis motion sensor coupled to ice floating on a body of water. The seismic information includes desired seismic information and the flexural wave information. The embodiment includes generating a noise model of the flexural wave information at least in part by band limiting each of the vertical directional component and the at least one horizontal component using an information processing device implementing a band filter to provide a band limited vertical directional component and a band limited horizontal directional component. A phase of the band limited horizontal directional component is rotated by 90 degrees. The noise model is improved using an adaptive correction filter using the rotated band limited horizontal directional component. The improved noise model is subtracted from the band limited vertical directional component to attenuate the flexural wave information wave in the band limited vertical directional component of the seismic information.

In yet another particular embodiment, a computer-readable medium having computer executable instructions stored thereon, that when executed using a computer, perform a method that includes receiving the seismic information using an information processing device interface, the seismic information having a plurality of directional components acquired using a multi-axis motion sensor coupled to ice floating on a body of water, the seismic information including desired seismic information and the flexural wave information. The instructions include instructions for generating a noise model of the flexural wave information using at least one of the plurality of seismic information directional components using an information processing device. The instructions in this particular embodiment further include improving the noise model using an adaptive correction filter, and applying the improved noise model to at least one directional component of the received seismic information to attenuate the flexural wave information wave in the seismic information.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A method for attenuating flexural wave information from seismic information, the method comprising:
   receiving the seismic information using an information processing device interface, the seismic information having a plurality of directional components acquired using a multi-axis motion sensor coupled to ice floating on a body of water, the seismic information including desired seismic information and the flexural wave information;
   using a band filter to limit seismic information in each of the plurality of directional components to a band containing noise;
   generating a noise model of the flexural wave information using at least one of the plurality of seismic information directional components using an information processing device;
   rotating a phase of at least one of the plurality of directional components;
   improving the noise model using an adaptive correction filter; and
   applying the improved noise model to at least one directional component of the received seismic information to attenuate the flexural wave information wave in the seismic information,
   wherein the at least one of the plurality of directional components includes a horizontal component, and
   wherein the act of rotating a phase of the at least one of the plurality of directional components further comprises rotating a phase of the horizontal component by 90 degrees.

2. A method according to claim 1, wherein the plurality of directional components includes a vertical component, the vertical component having the desired seismic information and the flexural wave information, the improved noise model being applied to the vertical component.

3. A method according to claim 1, wherein the plurality of directional components of the seismic information includes an in-line component having a direction parallel with a direction of flexural wave propagation along the ice, the modeling comprising using the in-line component.

4. A method according to claim 1, wherein the plurality of directional components of the seismic information includes a cross-line component having a direction normal to a direction of flexural wave propagation along the ice, the modeling comprising using the cross-line component.

5. A method according to claim 1, wherein the plurality of directional components of the seismic information includes an in-line component having a direction parallel with a direction of flexural wave propagation along the ice and a cross-line component having a direction normal to the direction of flexural wave propagation along the ice, the modeling comprising using each of the in-line component and the cross-line component.

6. A method according to claim 1, wherein the plurality of directional components of the seismic information includes a radial component having a direction parallel to the direction of flexural wave propagation along the ice, the modeling comprising using the radial component.

7. A method according to claim 1, wherein the multi-axis motion sensor recording the seismic information comprises a velocity sensor and the seismic information includes velocity information.

8. A method according to claim 1, wherein the multi-axis motion sensor recording the seismic information comprises an acceleration sensor and the seismic information includes acceleration information.

9. A method according to claim 8, wherein the acceleration sensor comprises three orthogonal digital accelerometers.

10. A method according to claim 1, wherein the band containing noise has a frequency range of 5 Hz to 30 Hz.

11. A method according to claim 1, wherein the band filter includes at least one of a 1D frequency filter, a 2D FK filter, a Tau-P filter, and a radial trace filter.

12. A method according to claim 1 further comprising removing flexural wave dispersion in the seismic information using dispersion correction.

13. A method according to claim 12 further comprising removing flexural wave dispersion in the seismic information by locally warping a time axis.

14. A method according to claim 12 further comprising removing flexural wave dispersion in the seismic information by compressing a noise wavelet using spectral phase shifting.

15. A method according to claim 1, wherein applying the improved noise model to at least one directional component of the received seismic information further comprises subtracting the improved model from the a vertical directional component of the seismic information.

16. A method according to claim 12 further comprising removing the dispersion correction after applying the improved model to the seismic information.

17. A method for attenuating flexural wave information from seismic information, the method comprising:
   receiving the seismic information using an information processing device interface, the seismic information having a vertical directional component and at least one horizontal component, the vertical directional component and at least one horizontal directional component acquired using a multi-axis motion sensor coupled to ice floating on a body of water, the seismic information including desired seismic information and the flexural wave information;
   generating a noise model of the flexural wave information at least in part by band limiting each of the vertical directional component and the at least one horizontal component using an information processing device implementing a band filter to provide a band limited vertical directional component and a band limited horizontal directional component;
   rotating a phase of the band limited horizontal directional component by 90 degrees;
   improving the noise model using an adaptive correction filter using the rotated band limited horizontal directional component; and
   subtracting the improved noise model from the band limited vertical directional component to attenuate the flexural wave information wave in the band limited vertical directional component, of the seismic information.

18. A method according to claim 17, wherein the at least one horizontal component includes a radial component having a direction parallel to the direction of flexural wave propagation along the ice, the modeling comprising using the radial component.

19. A method according to claim 17, wherein the multi-axis motion sensor recording the seismic information comprises an acceleration sensor and the seismic information includes acceleration information.

20. A method according to claim 17, wherein the band filter limits seismic information in each of the vertical directional component and the at least one horizontal directional component to a band containing noise.

21. A method according to claim 20, wherein the band containing noise has a frequency range of 5 Hz to 30 Hz.

22. A method according to claim 20, wherein the band filter includes at least one of a 1D frequency filter, a 2D FK filter, a Tau-P filter, and a radial trace filter.

23. A method according to claim 17 further comprising removing flexural wave dispersion in the seismic information using dispersion correction prior to implementing the band filter, wherein removing flexural wave dispersion includes at least one of locally warping a time axis and compressing a noise wavelet using spectral phase shifting.

* * * * *